United States Patent
Guimarin et al.

(10) Patent No.: US 11,791,636 B2
(45) Date of Patent: Oct. 17, 2023

(54) COORDINATED MULTIPLE DEVICE POWER MANAGEMENT SYSTEM

(71) Applicant: Off the Wall Energy Inc., Rancho Cordova, CA (US)

(72) Inventors: Robert Guimarin, Lake Zurich, IL (US); Kadir Yilmaz, Ontario (CA)

(73) Assignee: OFF THE WALL ENERGY INC., Rancho Cordova, CA (US)

( * ) Notice: Subject to any disclaimer, the term of this patent is extended or adjusted under 35 U.S.C. 154(b) by 8 days.

(21) Appl. No.: 17/708,590

(22) Filed: Mar. 30, 2022

(65) Prior Publication Data

US 2022/0294232 A1 Sep. 15, 2022

Related U.S. Application Data

(63) Continuation of application No. 16/517,573, filed on Jul. 20, 2019, now abandoned.

(60) Provisional application No. 62/673,976, filed on May 20, 2018.

(51) Int. Cl.
*H02J 4/00* (2006.01)
*H02J 7/00* (2006.01)

(52) U.S. Cl.
CPC .............. *H02J 4/00* (2013.01); *H02J 7/0014* (2013.01)

(58) Field of Classification Search
CPC .......... H02J 4/00; H02J 7/0014; H02J 7/0026; H02J 3/383
See application file for complete search history.

(56) References Cited

U.S. PATENT DOCUMENTS

| | | | |
|---|---|---|---|
| 5,111,127 A | 5/1992 | Johnson | |
| 7,508,163 B2 | 3/2009 | Batts-Gowins | |
| 8,611,107 B2 | 12/2013 | Chapman et al. | |
| 8,783,936 B2 | 7/2014 | Chien | |
| 9,006,940 B2 | 4/2015 | Korman | |
| 9,024,570 B2 | 5/2015 | Workman et al. | |
| 9,093,862 B2 | 7/2015 | Dennis et al. | |
| 9,728,964 B2 * | 8/2017 | Dunn | G08B 25/08 |
| 10,184,649 B2 | 1/2019 | Chien | |
| 10,403,866 B2 | 9/2019 | Vasefi et al. | |
| 2003/0230934 A1 | 12/2003 | Cordelli et al. | |
| 2008/0143290 A1 | 6/2008 | Chavakula | |

(Continued)

FOREIGN PATENT DOCUMENTS

KR 2212166 B1 * 2/2021

*Primary Examiner* — Jared Fureman
*Assistant Examiner* — Michael J Warmflash
(74) *Attorney, Agent, or Firm* — Greenberg Traurig, LLP

(57) ABSTRACT

A coordinated multiple power management system provides an efficient and unique means of controlling the power usage of devices attached to a personal energy platform. Power control in an abundant power situation (i.e. commercial power is available) saves money. Power control in a constrained power situation (i.e. commercial power is unavailable e.g. "power failure") provides more availability of needed computing services (for example, emergency activities, enable longer communication periods, longer video streaming, security monitoring, internet access and communications, or critical healthcare device usage etc.). The power supplied to the devices can be determined automatically and is under program control, which allows the complete management and distribution of power to any, and all, devices attached to the personal energy platform.

17 Claims, 11 Drawing Sheets

(56) References Cited

U.S. PATENT DOCUMENTS

| | | |
|---|---|---|
| 2010/0076615 A1 | 3/2010 | Daniel et al. |
| 2011/0228449 A1 | 9/2011 | Keebler et al. |
| 2013/0200841 A1 | 8/2013 | Farkas et al. |
| 2014/0077607 A1 | 3/2014 | Clarke et al. |
| 2014/0118982 A1* | 5/2014 | Roessler ........... H01M 10/4207 361/807 |
| 2015/0177768 A1 | 6/2015 | Liang |
| 2016/0018456 A1 | 1/2016 | Yilmaz |
| 2016/0329715 A1 | 11/2016 | Orr et al. |
| 2017/0192474 A1* | 7/2017 | Robinson ................ H02M 5/04 |
| 2019/0341793 A1 | 5/2019 | Chien |
| 2019/0267825 A1 | 8/2019 | Chien |

\* cited by examiner

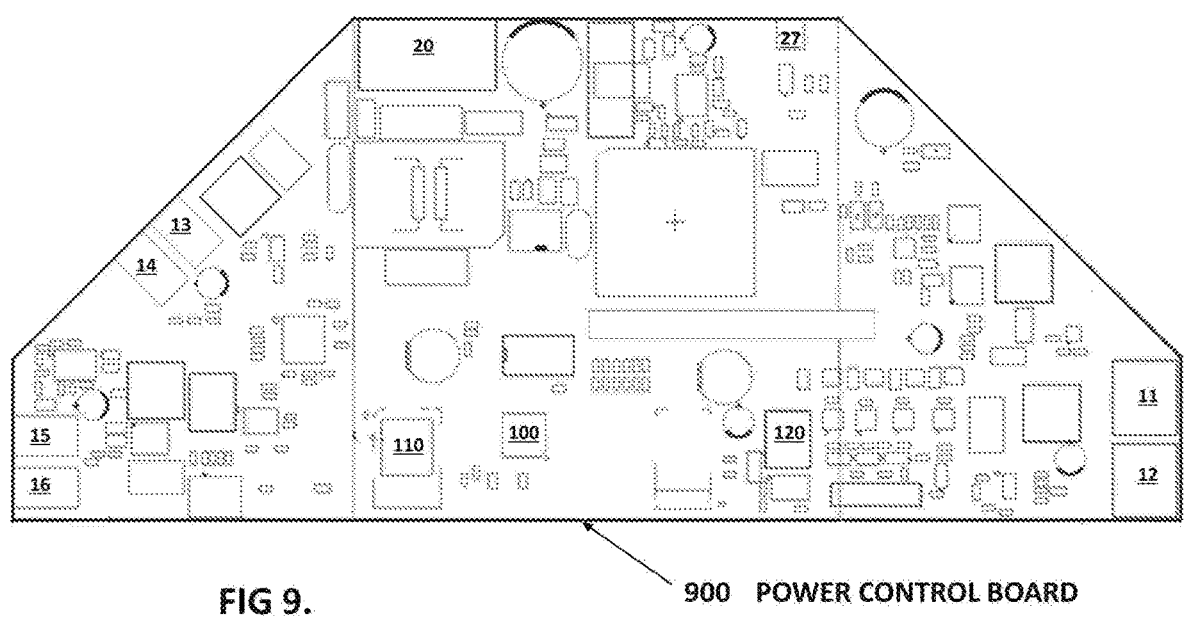
FIG 9.   900 POWER CONTROL BOARD

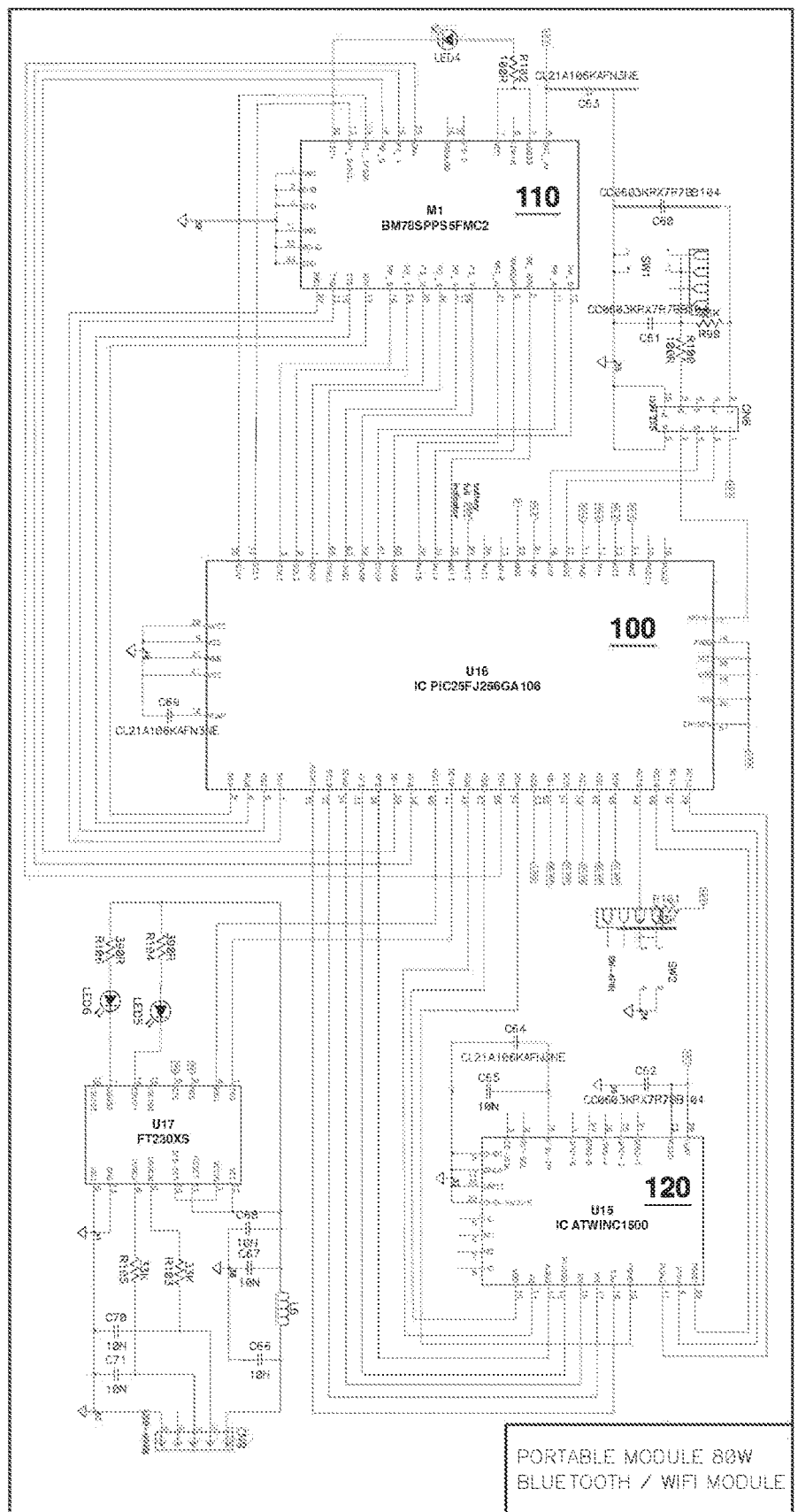
FIG. 10  901 PORTABLE MODULE 80W

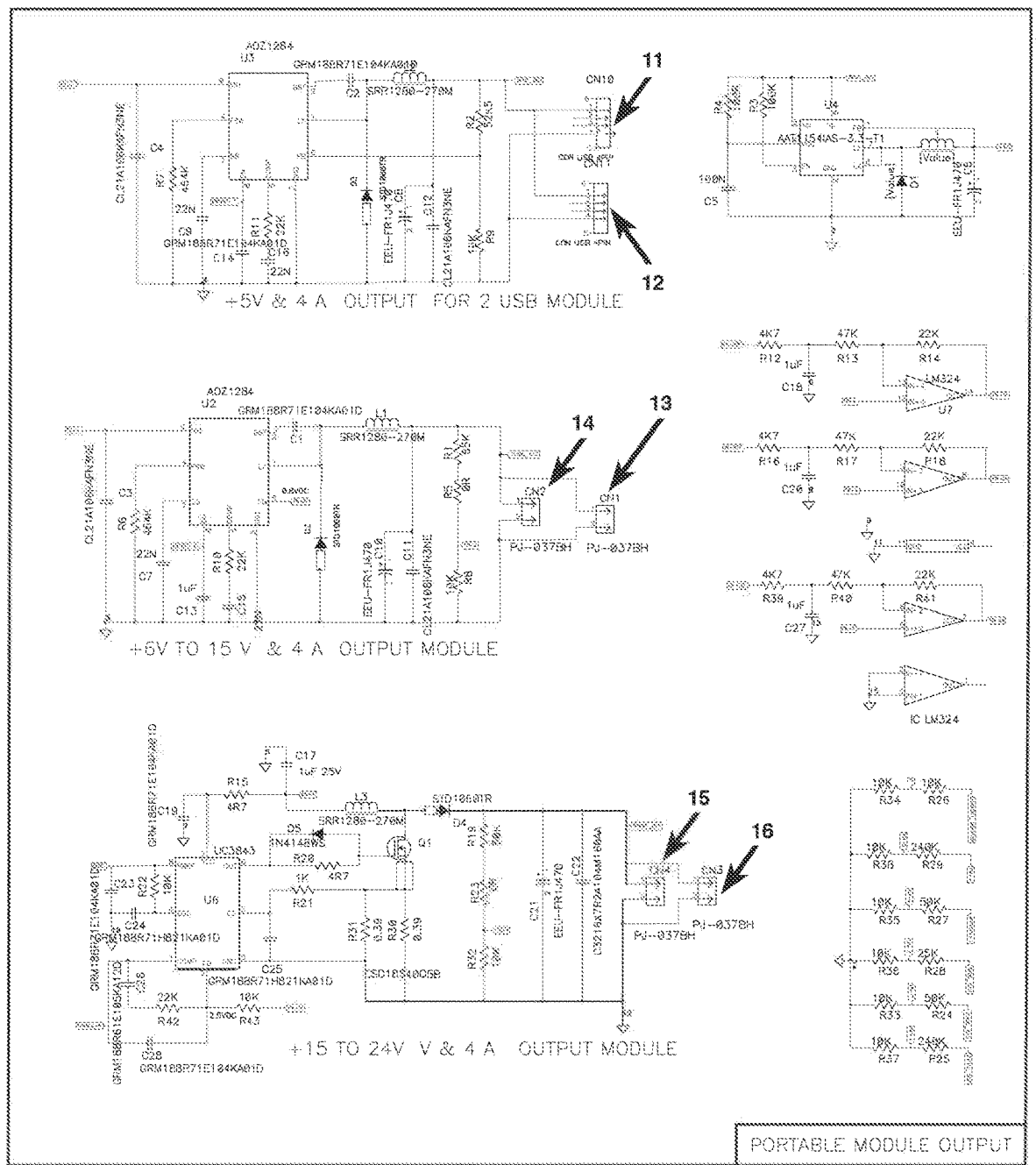
FIG. 11   902 PORTABLE MODULE OUTPUT

COORDINATED MULTIPLE DEVICE POWER MANAGEMENT SYSTEM

RELATED APPLICATION

This application is a Continuation application of U.S. patent application Ser. No. 16/517,573, filed Jul. 20, 2019, which claims priority to U.S. Provisional Patent Application No. 62/673,976 filed on May 20, 2018, the entire contents of which are incorporated herein by reference.

BACKGROUND

In the current marketplace, there are many individual single purpose consumer portable power supply systems that support a range of consumer products Alternating Current (AC) and Direct Current (DC) device power requirements. Portable power supply systems, commonly termed "Power Banks", allow for one (1) or two (2) AC output power ports, and one (1) to three (3) DC output power ports of predetermined and set voltages. Consumers have a desire to continue using their devices when the electric grid goes down, hence they have the need for battery backup or uninterruptible power supply (UPS) capabilities. Consumers often deploy multiple standalone products consisting of power banks and UPS systems, each having a rigidly defined set of input charging methods and output voltage port capabilities, limited power management capabilities, let alone a common consumer friendly power management user interface accessible across the collection of individual power supply system products.

In reviewing the prior art, there are portable AC and DC power supply systems that range from relatively low function to high function, respective to their energy storage capabilities, their overall size and weight, the number and types of AC and DC devices supported, the ease of transportability, and overall system costs. Conventional inventions in the low range typically weigh under 1 lb, have approximately 3200 mAh of energy storage capacity, support not more than two devices via universal serial bus (USB) power ports only, and minimally have a simple on-device light emitting diode (LED) showing the charging status or battery capacity level LED bar to provide operating information to consumers.

Once such invention in the lower range, is disclosed in U.S. Pat. No. 9,024,570 issued to Workman, Krantz, Ford, and Atkin which disclose a portable power supply that is lightweight, has minimal energy capacity, and supplies several USB device ports with auxiliary power to small handheld devices, mobile phones and tablets.

Conventional inventions of portable power supplies in the medium range typically weigh 30-45 lbs, have approximately 50,000 mAh of energy capacity, support a plurality of AC and direct DC ports, one or two USB ports, and have on-device switches for consumer control of the charging source selection and output power type, AC or DC, have predetermined and set output port voltage settings, and several LED status bars to display charging and battery capacity status information.

One such invention in the medium range is disclosed in U.S. Pat. No. 7,508,163 issued to Batts-Gowins which disclose an AC power supply unit with multiple uses. It is of moderate weight, medium energy storage capacity utilizing NiCad batteries, has multiple input charging methods from direct AC, 12 Volt (V) DC car battery, and a solar panel, supplies power to two AC output ports, a single 12V DC port, and a car jumpstart port. The invention has a power charging selection mode switch, a safety interrupt switch, and a digital display panel providing basic information; such as, time of day, voltage setting, and time to recharge information.

Conventional inventions in the high range power supply systems, more commonly referred to as residential energy storage systems, are non-portable and are generally a collection of individual power banks weighing several hundred pounds, connected in series, and installed in residential garage and basement areas where the physical installation space is available. Residential energy storage systems commonly provide 10 kWh to 20 kWh of energy storage capacity utilizing an extended array of multiple battery packs, consisting of various battery chemistries, lead-acid, nickel-cadmium (NiCad), and lithium ion (Li-Ion), and have high costs from $10,000 to $35,0000 dollars. These high range power supply systems require complex installation and management systems and are interconnected to the local utility AC grid, require multiple electric meters to monitor and manage the power flow between grid AC power and other potential DC power sources, and commonly provide whole-house power backup through the main residence power distribution panel and interior house wiring infrastructure. Additional design and installation costs are incurred should the consumer want to connect a renewable energy source, be that solar or wind, into the residential energy storage system.

While each of these conventional portable power supply system inventions provide useful benefits to consumers, they lack more comprehensive power management system capabilities and the direct consumer enabled control, desired by today's highly mobile and electronically connected consumers.

A comprehensive power management solution is needed for consumers and enterprise employees who have a collection of devices that perform independent activities; such as, printing, displaying pictures, listening to music, playing video etc. As well as, devices that form a "system" by performing coordinated tasks such as surfing the Internet, which typically requires a cable modem, a router, a display and a computer. Typically, devices are active using power and doing nothing (even if appeared to be turned off, they often consume power in a stand-by state). Significant power can be saved by allowing power to flow only to devices that are only currently active and doing something useful. This means better power usage characteristics when power is plentiful; which saves money. This also means better power usage characteristics when power is scarce and when power availability is needed, and perhaps the length of time it is available is critical. Effective power management in consumer settings is a challenge due to the large variation of usage patterns of consumer devices and the enormous possible activities of humans.

The present invention described as a Personal Energy Platform (PEP) gives electric power control back to consumers. There is a huge gap between current low capacity, low smarts, auxiliary power storage for phones, tablets, and, the bulky expensive stationary battery storage systems available to consumers to support their multiple devices' power needs. The present invention fills the gap between the medium function and medium energy storage capacity portable power supply segment and the overly complex high capacity residential energy storage segment, in a way that gives maximum mobility, equivalent energy storage capacity, similar residential energy storage capabilities, broader end device support, and more discreet power management and control to the consumer.

SUMMARY

The present invention has two novel pieces. One is the Personal Energy Platform itself. The other is a physically and logically modular system enabled by using a smart power management device, such as the Personal Energy Platform described, that is designed to solve the economics and complexity of versatile, effective, and efficient power management in any situational context. A typical system consists of a Personal Energy Platform, and other parts, which can be combined in some embodiments or modularized further in other embodiments:

The Personal Energy Platform contains an integrated computing environment including an advanced power control board, multi-function micro-controller processor, power management system, battery management system, and BLUETOOTH and Wi-Fi communications modules. The invention provides a lightweight, robustly powered, wireless communications, and remotely managed AC and DC power source easily controlled by a smartphone or tablet. Consumers can view power and device usage information and gain command and control access to the internal power management system and battery management system functions through communications between the Personal Energy Platform and a smart phone, or tablet, that is supported via a mobile application uniquely developed for the present invention.

The Personal Energy Platform provides power to any AC, DC, or USB connectible mobile devices; phones, tablets, cameras and many other everyday consumer devices. Furthermore, the present invention allows for the consumer to maintain the same level of personal power management and control irrespective of the various global AC power voltage standards or their geographic location.

The Personal Energy Platform concurrently supports directly connected AC voltage devices and medium DC voltage powered devices; laptops, telescopes, radios, routers, cameras, health monitor equipment, lanterns, residential gateways, security systems, and a wide array of legacy devices via a universal DC input port, and specific end device OEM compliant DC power cords, thus eliminating the need for individual device AC-to-DC inverter power cords.

Communication for management and control of the Personal Energy Platform by the consumer could be direct via the corresponding mobile application (APP) via BLUETOOTH or Wi-Fi wireless protocols, or work in concert with consumer smart speaker or home assistant product via a voice command interface. The present invention communications system consists of the Personal Energy Platform and an Android or iOS client program running in a wireless equipped smart phone or tablet device capable of running the App. The App controls, manages, and programs the desired consumer power usage profiles and power output capabilities of the Personal Energy Platform.

The Personal Energy Platform contains multiple USB 5V output ports, multiple DC output ports that support 6 Volt to 24 Volt powered devices (individual loads) and multiple AC output ports. The App controls the current and voltage delivered to attached devices; as well as, turning on and off of individual ports, displaying the Personal Energy Platform energy storage capacity (battery power) status, and allowing for the personalization and labeling of individual Personal Energy Platform devices and individual output ports with common easily understandable names; e.g. Living room PEP and/or Garage security camera port.

The present invention seeks to remove complexity and provide the consumer with intuitive and easy methods to control and configure the Personal Energy Platform and its components. In an example of this ease of use, the App presents the consumer with a set of standard off-the-shelf battery images (AAA, AA, C, D, 9-Volt), for a device normally powered by commercial batteries and whereby the consumer wants to plug the device into the present invention as the DC power source. In this use case, the consumer can use the App to select the image of the battery type and input the quantity of individual commercial batteries the device uses to determine the device's voltage and current. Once selected, the App performs the necessary voltage calculation and will program the appropriate voltage and current of the Personal Energy Platform DC output port in preparation for connecting the device.

For the ultimate in ease of use; the App allows the consumer to take a picture of an existing or new device and then upload the picture to a Cloud service, where the device type, manufacturer, DC power cord connector type, and power specifications are determined. The Cloud service automatically returns the power specifications to the App, which then automatically labels and configures the DC output port location, and voltage and current settings associated with the device without any further consumer intervention.

The App maintains a history of knowledge of previous and current consumer devices and their power specifications. And, the Personal Energy Platform maintains a history knowledge of previous and current consumer devices' power specifications.

BRIEF DESCRIPTION OF THE FIGURES

The detailed description of some embodiments of the invention is made below with reference to the accompanying figures, wherein like numerals represent corresponding parts of the figures.

FIG. 9 shows a schematic view of one embodiment of the present invention;

FIG. 10 shows a schematic view of one embodiment of the present invention; and

FIG. 11 shows a schematic view of one embodiment of the present invention.

DETAILED DESCRIPTION OF CERTAIN EMBODIMENTS

An exemplary embodiment of the invention is discussed in detail below. While specific exemplary embodiments are discussed, it should be understood, that this is done for illustration purposes only. A person skilled in the relevant art will recognize that other components and configurations can be used without parting from the spirit and scope of the invention.

The invention is an apparatus and a system with methods that provide power management that encompasses any power modular set of consumer devices.

Figure 1:
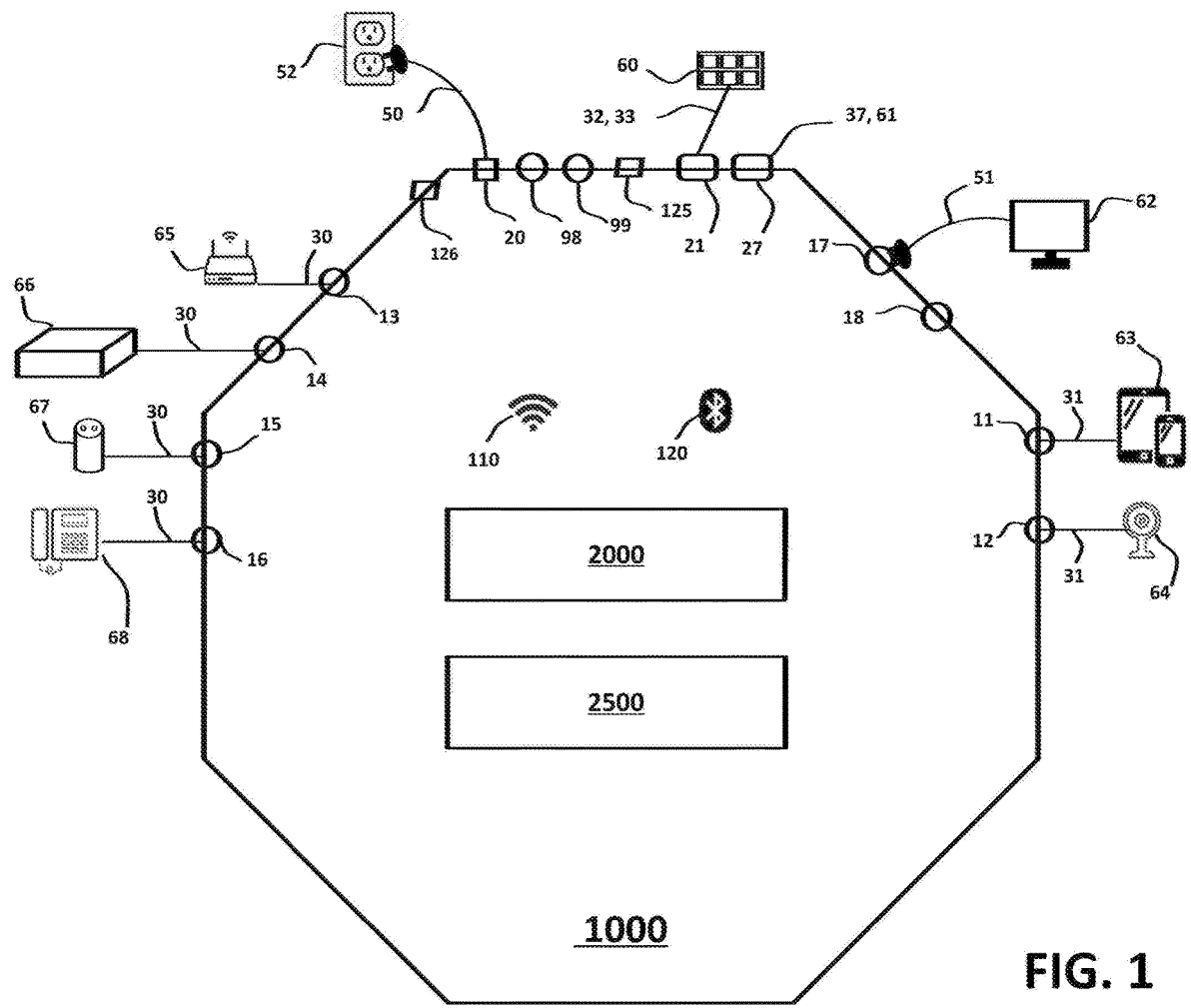
FIG. 1 shows a schematic view of one embodiment of the present invention.
Figure 1:
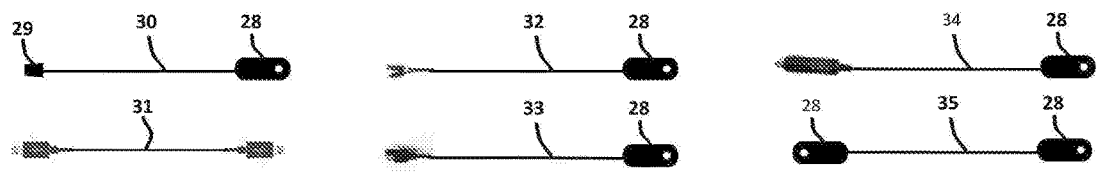
Figure 3:
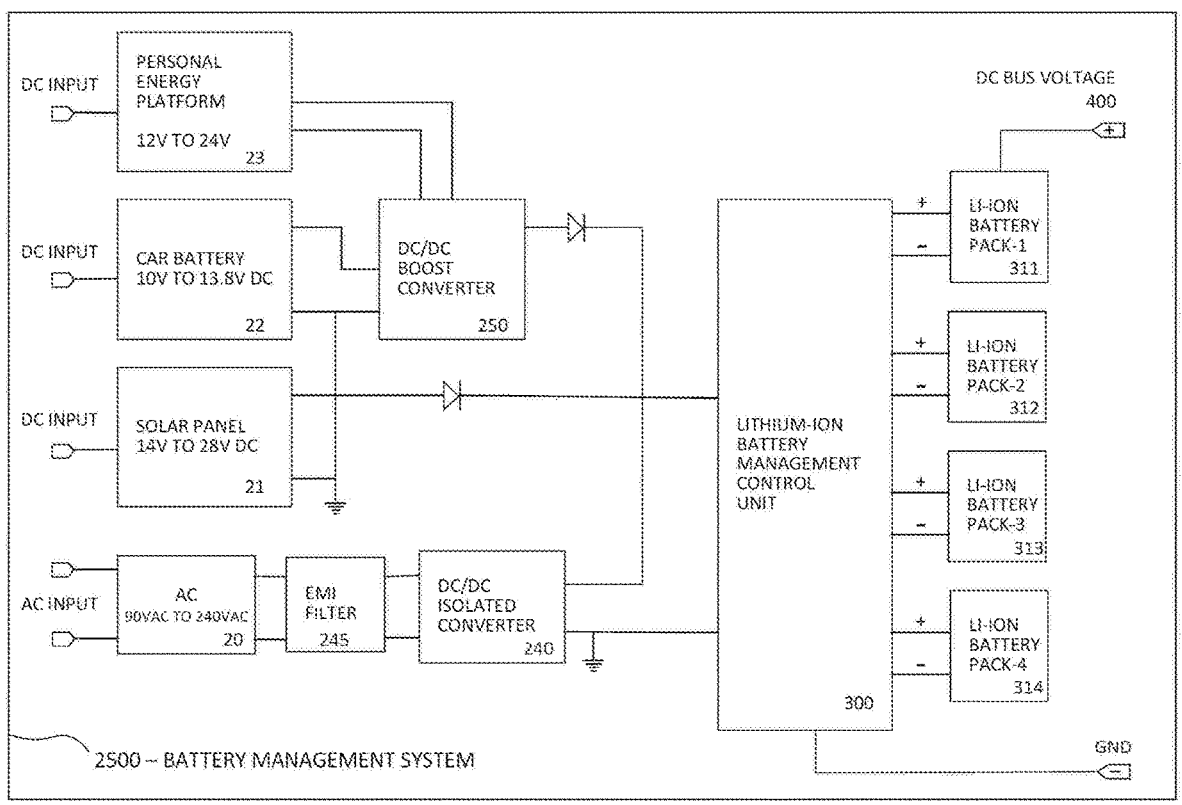
FIG. 3 shows a schematic view of one embodiment of the present invention.
Figure 4:
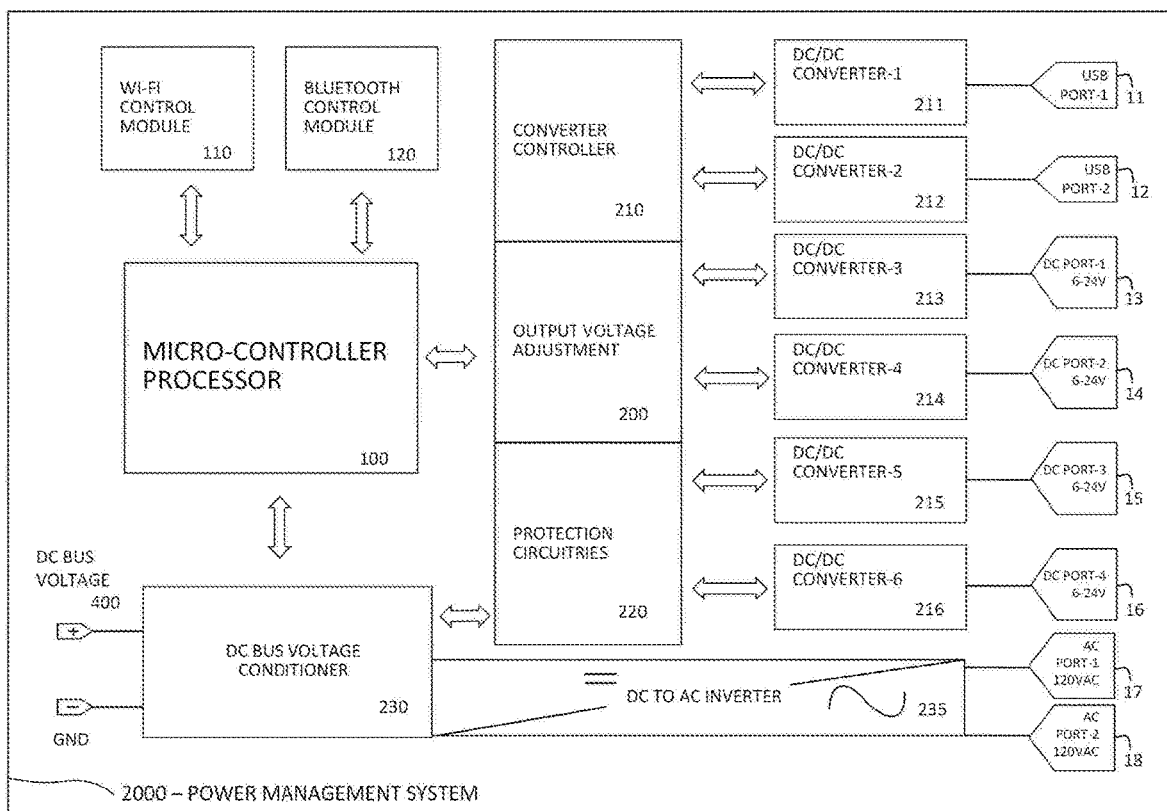
FIG. 4 shows a schematic view of one embodiment of the present invention.

Shown in FIG. 1 is a perspective view of the present invention showing the personal energy platform 1000, an eight-sided octagon shaped platform with a plurality of power source input ports and a plurality of power output ports. In the interior of the invention are at least one highly efficient rechargeable battery, preferably lithium ion, or any other efficient rechargeable battery, available in the marketplace. Shown in FIG. 1 is a perspective view of the present invention depicting the personal energy platform's internal power management system 2000 and battery management system 2500 functional capabilities. Shown in FIG. 3 and FIG. 4 are additional functional perspectives of the present invention's power management system 2000 and battery management system 2500. Shown in FIG. 1 is a perspective view of the present invention showing the personal energy platform's power source inputs, alternating current source port 20 and a universal direct current power input port 27, along with the power output device ports, a first alternating current output port 17, a first universal serial bus output port 11 and a second universal serial bus output port 12, a first direct current output port 13, a second direct current output port 14, a third direct current output port 15, and a fourth direct current output port 16. Shown in FIG. 1 is a 90 volt alternating current to 240 volt alternating current input module 20, which can access any alternating current power source, like a local electric utility grid, through an alternating current power input source wall outlet 52, providing 120 volt alternating current or 240 volt alternating current power via the standard alternating current power input cord 50 specification suitable for the global alternating current standard in the location where the invention 1000 is used. Additionally, shown in FIG. 1 is a perspective view of the present invention 1000 showing the physical consumer information and control functions physically located on the personal energy platform; an alternating current input status light emitting diode 98 and a battery status light emitting diode 99, a BLUETOOTH pairing switch 125 to wirelessly communicate with a mobile application 40, and a power off-on switch 126 to enable and disable the personal energy platform's input power source ports, a 90 volt alternating current to 240 volt alternating current input module 20 and a universal direct current power input port 27 and a first universal serial bus output port 11 and a second universal serial bus output port 12, a first direct current output port 13, a second direct current output port 14, a third direct current output port 15, and a fourth direct current output port 16, and a first alternating current output port 17, providing consumers with the ability to completely turn the invention 1000 off and on. Additionally, shown in FIG. 1 is a perspective view of the present invention 1000 showing that the personal energy platform 1000 may access power via multiple power sources, an alternating current power input source wall outlet 52 via an alternating current power input 50, a direct current input power source commercial solar panel 60 via a solar panel MC-4 power adapter cord 32 or a solar panel SAE power adapter cord 33, and a direct current universal input port 27 for car battery direct current input 37 via a cigarette lighter power adapter cord 34, and a direct current universal input port 27 for personal energy platform direct current input 61 via a personal energy platform interconnection power cord 35. The power management system 2000 provides the consumer the lowest cost power source selection by utilizing a direct current solar panel input power source 60, a personal energy platform direct current input power 61, a car battery direct current input source 37, when the direct current power source voltage generation levels are available and sufficient, prior to accessing power via an alternating current power input source wall outlet 52. Additionally, shown in FIG. 1 is a perspective view of the present invention 1000 showing a consumer device specific direct current output cord 30 that eliminates the need for individual device original equipment manufacturer alternating current to direct current inverter power cord. The power management system 2000 provides an integrated alternating current to direct current inverter function to support a plurality of consumer direct current devices, a mobile device 63, a consumer internet world wide web accessible camera 64, an internet accessible Wi-Fi router 65, a set-top streaming device 66, a smart speaker home assistant device 67, and a telephone system 68. A consumer device specific direct current output cord 30 has a device power adapter cord personal energy platform input plug 28 for connection to a first direct current output port 13, to a second direct current output port 14, to a third direct current output port 15, to a fourth direct current output port 16 and a device specific direct current input plug 29 for connection to consumer devices, an internet accessible Wi-Fi router 65, a set-top streaming device 66, a smart speaker home assistant device 67, and a telephone system 68. The invention 1000 provides power to universal serial bus devices, a mobile device 63 and a consumer internet world wide web accessible camera 64 via a first universal serial bus output port 11 and a second universal serial bus output port 12 using a standard universal serial bus power cord 31. Additionally, shown in FIG. 1 is the perspective view of the present invention 1000 showing a mobile application 40, running on a mobile device 63 and communicating with the personal energy platform 1000 and a mobile device wireless communications capabilities via a Wi-Fi control module 112 and a mobile device BLUETOOTH control module 122. A mobile application 40 communicates directly with a BLUETOOTH control module 120 and a Wi-Fi control module 110 functions to provide the consumer real-time personal energy platform 1000 status information and consumer coordinated management control of multiple devices accessing power via the invention.

Figure 2:
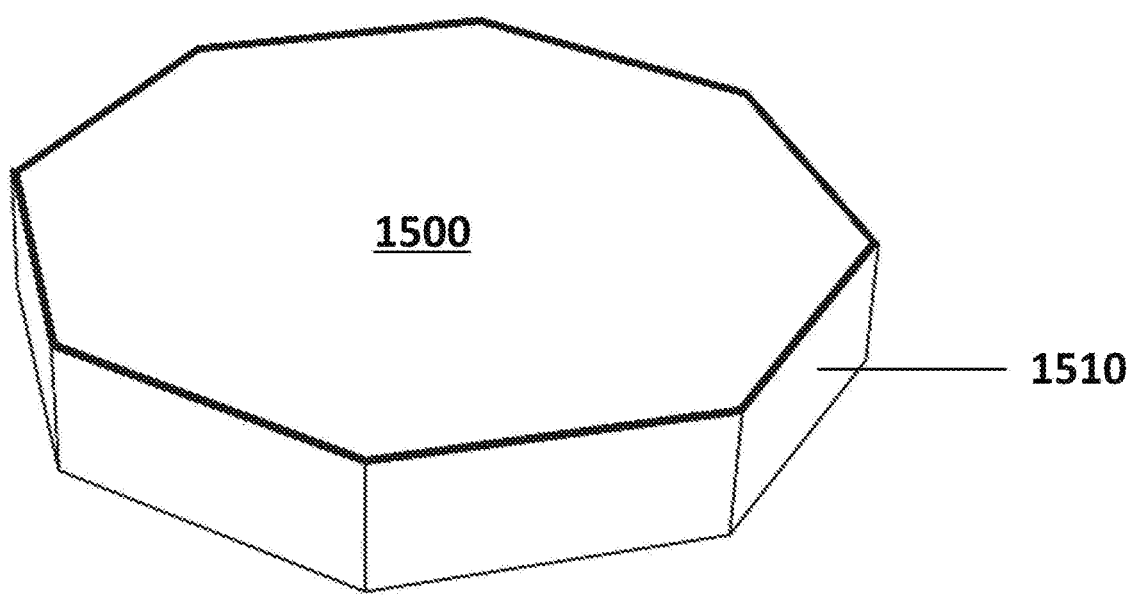
FIG. 2 shows a front perspective view of one embodiment of the present invention.

Shown in FIG. 2 is a perspective view of the present invention showing a three-dimensional perspective of the invention's external housing enclosure 1500, viewed from the front position. The invention's external housing enclosure 1500 is octagonal shaped consistent in scale to support a personal energy platform 1000 physical and logical invention embodiment, a power management system 2000, a battery management system 2500, all input and output ports, status light emitting diodes, and manual control switches located on the back and sides of the external housing enclosure 1500. FIG. 2 depicts the invention's external housing enclosure variable height capability 1510, that allows for increased energy storage capacity via higher quantity of battery cell to battery pack ratios. The invention 1000 provides an esthetically pleasant view from the consumer-facing front position, having no power source or output connectivity ports deployed on the three front sides of the external housing enclosure 1500.

Shown in FIG. 3 is a depiction of the present invention's internal electrical functions. FIG. 3 depicts the invention battery management system 2500 main functions; lithium-ion battery management control unit 300, a first lithium-ion battery pack 311, a second lithium-ion battery pack 312, a third lithium-ion battery pack 313, and a fourth lithium-ion battery pack 314, a direct current to direct current boost converter 250, a direct current to direct current isolated converter 240, an electro-magnetic filter 245, a 90 volt alternating current to 240 volt alternating current input module 20, a solar panel 14 volt to 28 volt direct current module 21, a car battery 10 volt to 13.8 volt direct current module 22, and a personal energy platform 12 volt to 24 volt module 23. FIG. 3 depicts the internal battery management system 2500 (that is powered by various energy input sources.) These sources could be an alternating current power source or a direct current power source. The battery management system 2500 input source utilization is made in such a way that priority is given to direct current power sources over alternating current power sources. FIG. 3. depicts the invention's utilization of a direct current bus voltage 400 as the prime power source. The direct current bus voltage 400 is powered by the battery management control unit 300 or any input power source. In the absence of alternating current power and direct current power the battery management control unit 300 automatically delivers the stored power of a first lithium-ion battery pack 311, a second lithium-ion battery pack 312, a third lithium-ion battery pack 313, and a fourth lithium-ion battery pack 314 to the direct current bus voltage 400. The battery management control unit 300 is designed in such a way that multiple battery cells could be connected in series and/or parallel and maintain individual battery cell charge and discharge capabilities equally. The battery management control unit 300 implements a unique cell equalization control circuitry that operates in conjunction with the overall battery management system 2500 to extend individual battery cell life and maximize their individual and collective energy storage capability without degrading battery lifecycle expectancy.

Shown in FIG. 4 is a depiction of the present invention's internal electrical functions. FIG. 4. depicts the invention's power management system 2000 main functions; micro-controller processor 100, a direct current bus voltage conditioner 230, a direct current to alternating current inverter 235, a converter controller 210, an output voltage adjustment module 200, protection circuitries 220, for wireless communications a Wi-Fi control module 110 and a BLUETOOTH control module 120, a first direct current to direct current converter 211, a second direct current to direct current converter 212, a third direct current to direct current converter 213, a fourth direct current to direct current converter 214, a fifth direct current to direct current converter 215, a sixth direct current to direct current converter 216 and a first universal serial bus output port 11, a second universal serial bus output port 12, a first direct current output port 13, a second direct current output port 14, a third direct current output port 15, a fourth direct current output port 16, a first alternating current output port 17, and a second alternating current output port 18. FIG. 4. depicts the invention's utilization of a direct current bus voltage 400 as the prime power source.

Figure 5:
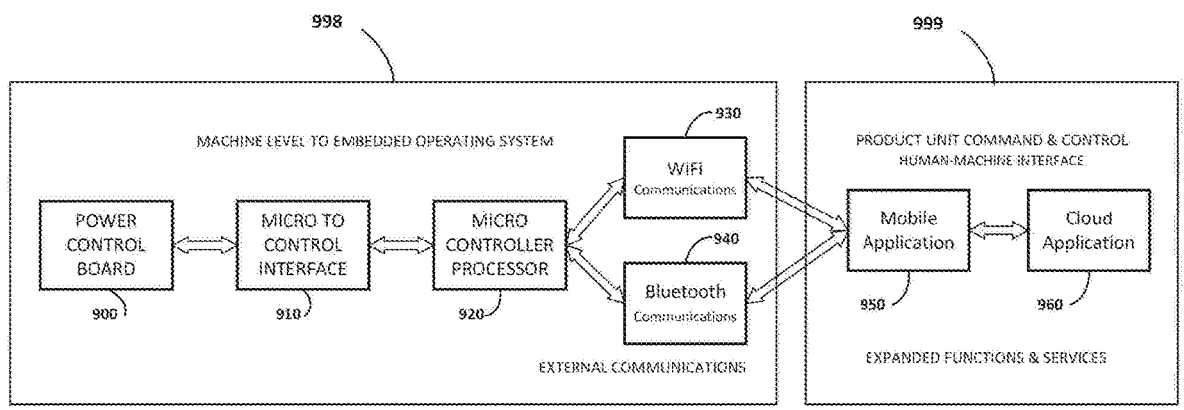
FIG. 5 shows a schematic view of one embodiment of the present invention.

Shown in FIG. 5 is a perspective view of the present invention's overall programmable control logic and communication processes; machine level to embedded operating system 998 and a product unit command and control human-machine-interface for expanded functions and services 999. All output ports are powered by a power control board 900, a micro to controller interface 910 section provides required analog signals to the micro-controller processor program 920 for monitoring and control purposes. Furthermore, the micro to controller interface 910 section provides relevant command signals to the power control board for program execution elements coming from micro-controller processor 920. The micro-controller processor 920 section of the board communicates bi-directionally with the Wi-Fi 930 communications and/or BLUETOOTH 940 communication modules which facilitate sending all monitoring information to the mobile application 950 and receive all management command information for multiple devices and usage scenarios from the consumer. The mobile application 950 utilizes industry standard Android and iOS Wi-Fi and BLUETOOTH communications capabilities of commercially available smartphones, tablets and other consumer devices and requires no special hardware or software on those devices. The mobile application 950 is architected and developed to communicate with 3rd party cloud-based applications 960 utilizing standard internet protocols and industry applications program interfaces to expand the functions and services the invention provides.

Figure 6:
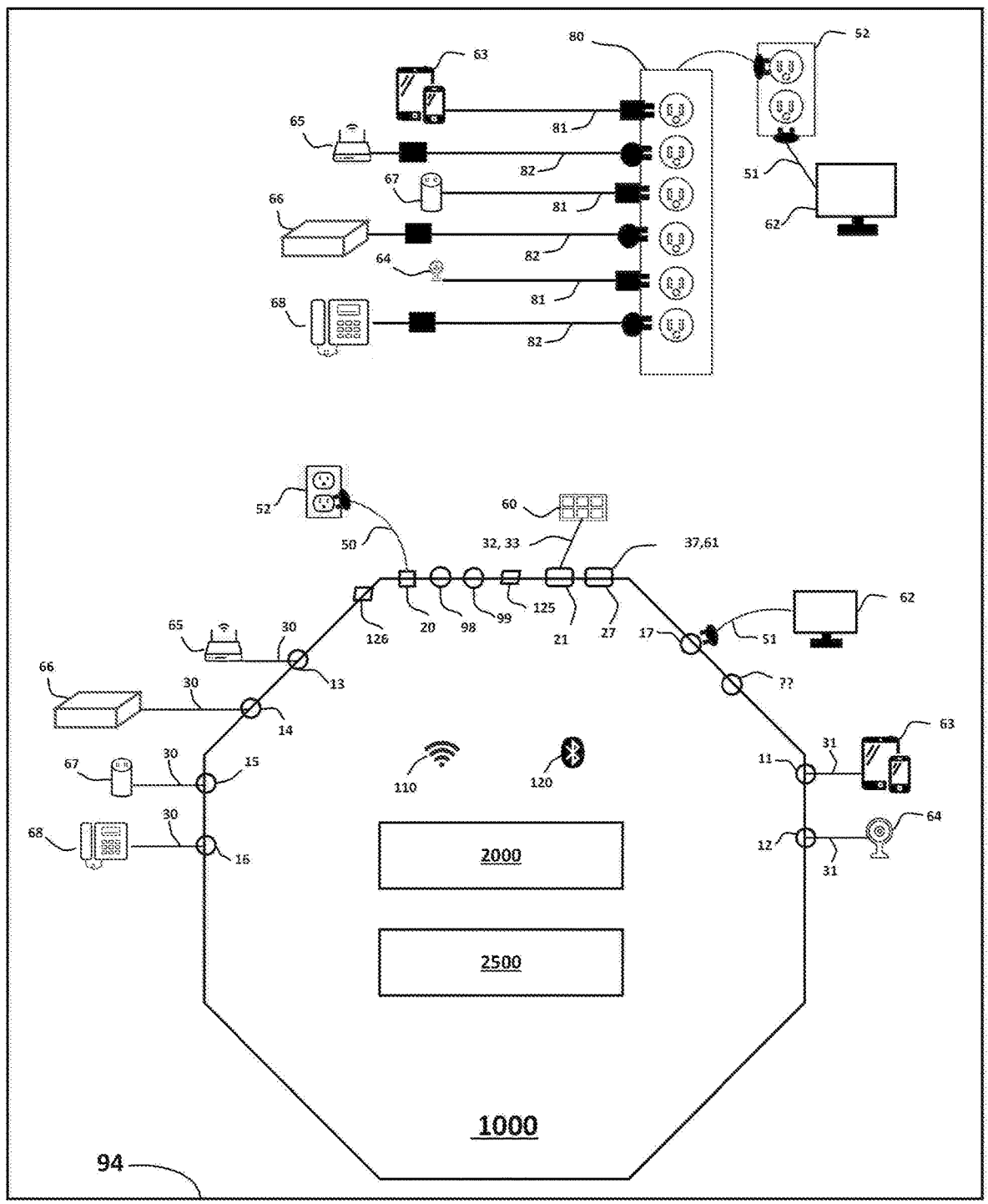
FIG. 6 shows a schematic view of one embodiment of the present invention.

Shown in FIG. 6 is a perspective view of the present invention 1000 showing a cord clutter elimination use case 94 with an alternating current outlet extender 6-outlet power strip 80 and a personal energy platform 1000 to illustrate the elimination an alternating current outlet extender 6-outlet power strip 80. The alternating current outlet extender 6-outlet power strip 80 provides power to multiple consumer end devices each which has an individual alternating current to direct current inverter function, commonly called a "wall wart", integrated with the original equipment manufacturer device power cord. Shown in FIG. 6 is a representation of common consumer communication and entertainment systems that use a combination of an Internet accessible Wi-Fi router 65, a television 62, a telephone system 68, a set-top streaming device 66, a smart speaker home assistant device 67, a consumer internet world wide web accessible camera 64, and a mobile device 63. The present invention 1000 provides a means to eliminate "power cord clutter", enhance power efficiency, and provide backup power to attached consumer devices during commercial power grid outages. FIG. 6 depicts a common consumer alternating current power access configuration, an alternating current outlet extender 6-outlet power strip 80 with six consumer devices, a mobile device 63 with an alternating current power cord with front position direct current inverter 81, an Internet accessible Wi-Fi router 65 with an alternating current power cord with rear position direct current inverter 82, a smart speaker home assistant device 67 with an alternating current power cord with front position direct current inverter 81, a set-top streaming device 66 with an alternating current power cord with rear position direct current inverter 82, a consumer internet world wide web accessible camera 64 with an alternating current power cord with front position direct current inverter 81, and a telephone system 68 with an alternating current power cord with rear position direct current inverter 82, an alternating current power input source wall outlet 52, an alternating current output cord 51, and a television 62. Additionally, FIG. 6 depicts the present invention 1000 connected with a mobile device 63 connected to a first universal serial bus port 11 via a standard universal serial bus power cord 31, a consumer internet world wide web accessible camera 64 connected to a second universal serial bus port 12 via a standard universal serial bus power cord 31, an Internet accessible Wi-Fi router 65 connected to a first direct current output port 13 via a device specific direct current power cord 29, a set-top streaming device 66 connected to a second direct current output port 14 via a device specific direct current power cord 29, a smart speaker home assistant device 67 connected to a third direct current output port 15 via a device specific direct current power cord 29, and a telephone system 68 connected to a fourth direct current output port 16 via a device specific direct current power cord 29. FIG. 6 depicts a television 62 connected to a first alternating current output port 17 via a standard alternating current power cord 51. The invention's internal battery management system 2500 provides am alternating current to direct current inverter function that eliminates the need for individual devices to use an alternating current power cord with front position direct current inverter 81 and an alternating current power cord with rear position direct current inverter 82. Further represented in FIG. 6 is the present invention's ability for the consumer to discontinue the use an alternating current outlet extender 6-outlet power strip 80. Additionally, shown in FIG. 6 is the perspective of the present invention 1000 to improve the overall power efficiency by eliminating alternating current outlet extender 6-outlet power strip 80, the alternating current power cord with front position direct current inverter 81 and the alternating current power cord with rear position direct current inverter 82, all which consume power whether the connected devices are in use or powered off. The consumer gains reduced power costs through the power efficiency gained by eliminating the need for multiple alternating current to direct current inverters and potential need for multiple power strips which contain their own individual power inefficiencies. The total aggregate inefficiency of parallel power streams is eliminated by the invention.

Figure 7:
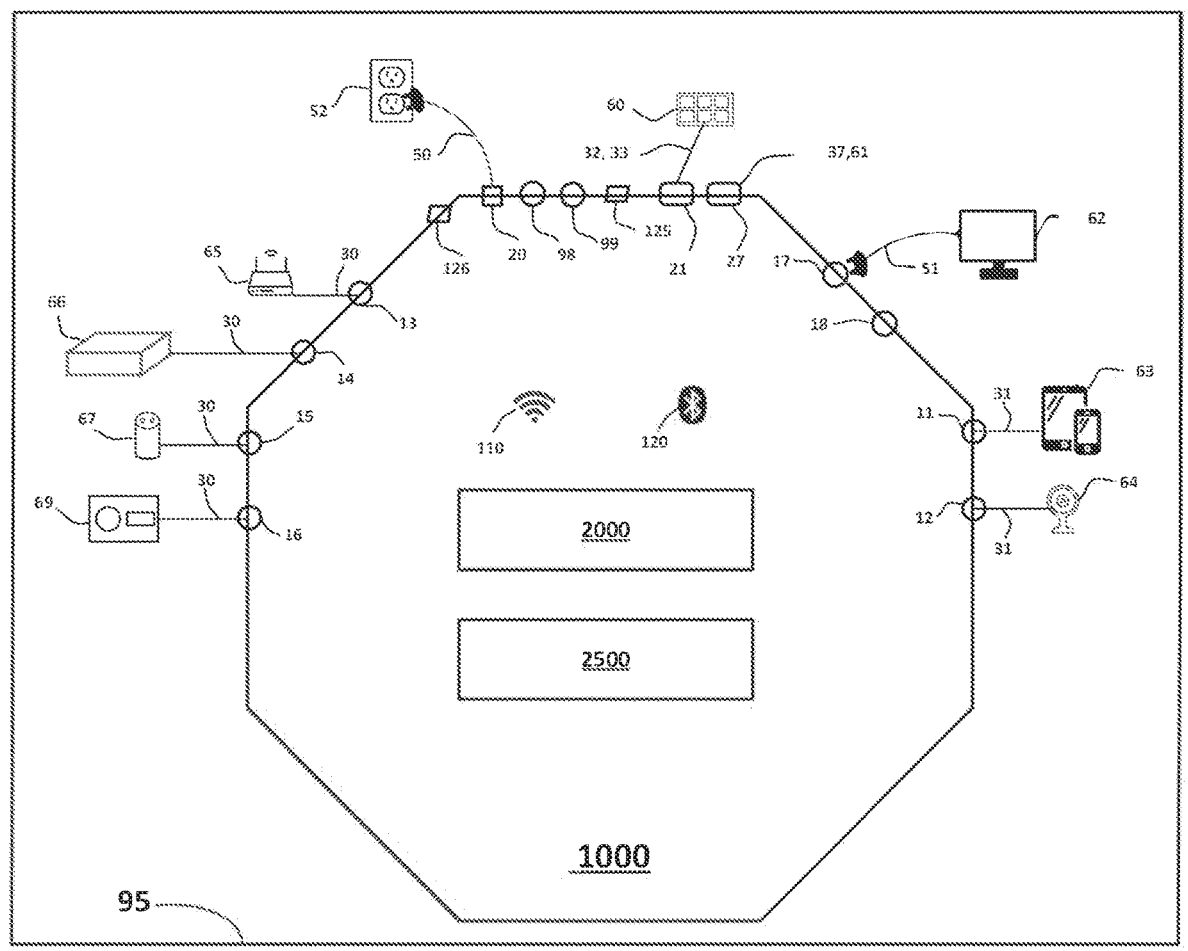
FIG. 7 shows a schematic view of one embodiment of the present invention.

Shown in FIG. 7 is a perspective view of the present invention showing a use case, Consumer Controlled Backup Power Management 95, that allows the consumer to selectively determine the allocation of the invention's battery backup power system to allocate power to individual end devices. In the event of a reduction in power input voltage levels or a total loss of power or for a consumer determined critical device power backup contingency, the invention 1000 can be preprogrammed to automatically reconfigure one or more output port settings to provide longevity of services or emergency services. FIG. 7 further depicts an example of the Consumer Controlled Backup Power Management 95 in which there is a loss of commercial grid alternating current power via an alternating current power input source wall outlet 52, and the consumer has predetermined selective devices consisting of a continuous positive airway pressure 69 medical device, a smart speaker home assistant device 67, an Internet accessible Wi-Fi router 65, a mobile device 63, and a consumer internet world wide web accessible camera 64 as critical and should continue to receive power while discontinuing power to the non-critical devices consisting of a set-top streaming device 66 and a television 62. FIG. 7 depicts the present invention configured to support a consumer home healthcare environment deemed critical, whereby the consumer has an Internet accessible Wi-Fi router 65 to gain access to the internet and their healthcare provider's real-time monitoring service, a mobile device 63 and a mobile application 40 that provides communications to the consumer's healthcare provider to provide real-time safety, video monitoring via a consumer internet world wide web accessible camera, and other essential communications. When the grid alternating current power becomes unavailable, the invention 1000 automatically reallocates the battery backup power to just those devices identified as critical, a continuous positive airway pressure 69 medical device, a smart speaker home assistant device 67, an Internet accessible Wi-Fi router 65, a mobile device 63, and a consumer internet world wide web accessible camera 64. Additionally, the consumer can use the mobile application 40 after the grid alternating current power outage to dynamically override or modify the predetermined battery backup power reallocation configuration of connected devices, dependent on the expectation of the outage severity.

Figure 8:
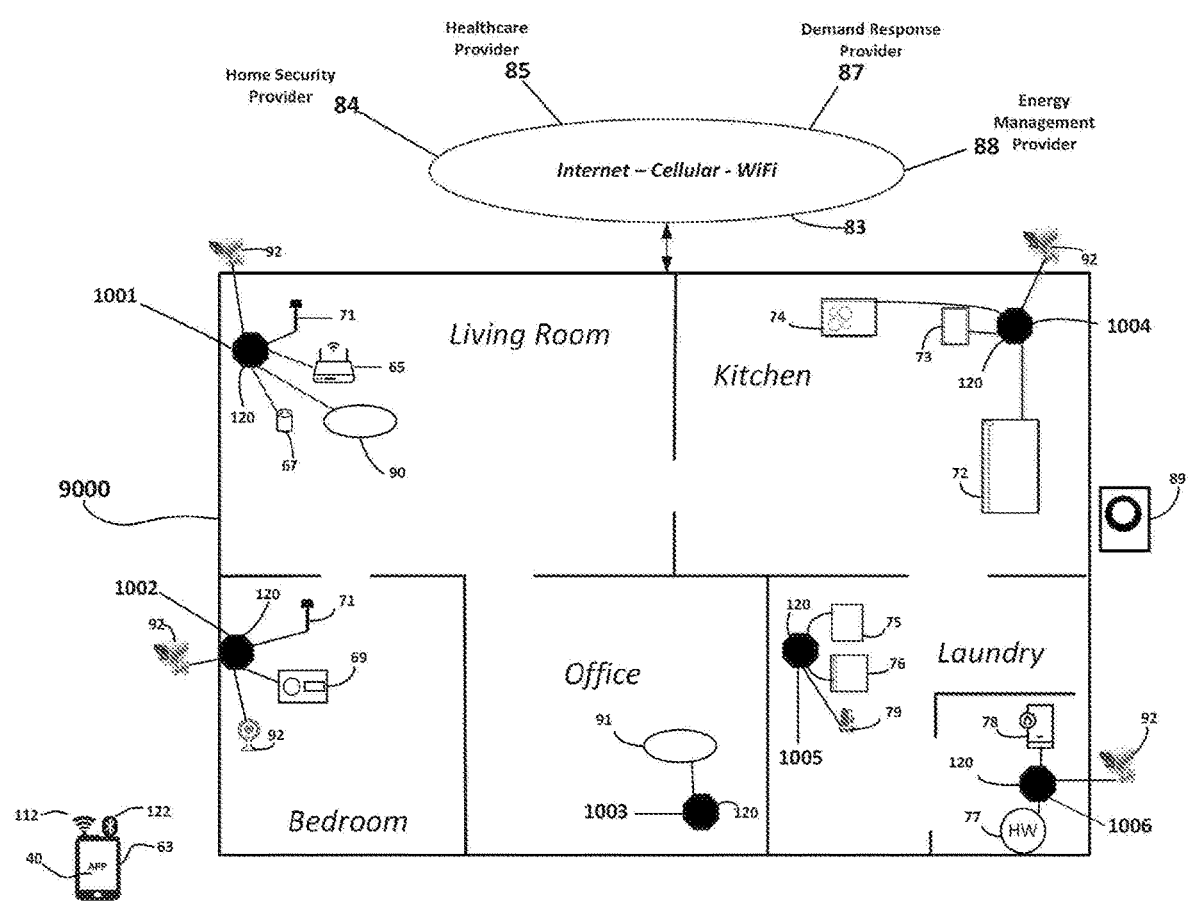
FIG. 8 shows a schematic view of one embodiment of the present invention.

Shown in FIG. 8 is a perspective of the present invention 1000 providing a use case for Energy Storage and Remote Services capabilities. FIG. 8 depicts six of the present invention units that are located within the consumer's residence 9000, be that a house, apartment, tiny home and/or mobile home, where each individual invention is configured to provide power to a localized set of consumer end devices. FIG. 8 presents the present invention 1000 ability to scale up accessible power to cover an entire home by utilizing multiple individual invention units as represented by living room personal energy platform 1001, a bedroom room personal energy platform 1002, an office personal energy platform 1003, a kitchen personal energy platform 1004, a first laundry room personal energy platform 1005, and a second laundry room personal energy platform 1006. Additionally, FIG. 8 depicts in the living room an invention 1001 that supports an internet accessible Wi-FI router 65, a smart speaker home assistant device 67, a lighting system lamp 71, an outdoor security camera 92, and a collection of entertainment devices 90. FIG. 8 presents in the bedroom room a personal energy platform 1002 providing power to an outdoor security camera 92, a consumer internet world wide web accessible camera 64, a lighting system lamp 71, and a continuous positive airway pressure 69 medical device utilized by the consumer during the night. In the office is depicted invention 1003 providing power to a collection of office devices 91. FIG. 8 depicts in the kitchen an invention 1004 providing power to an outdoor security camera 92, a stove 74, a microware 73, and a refrigerator 72. FIG. 8 depicts in the laundry room an invention 1005 providing power to a clothes washing machine 75, a clothes dryer 76, and a sump pump water extraction unit 79. Additionally, FIG. 8 depicts in the laundry room an invention 1006 providing power to an outdoor security camera 92, a water heater 77, and a heating, ventilation, air conditioning unit 78. Each of the multiple invention units deployed have peer-to-peer wireless communications via a Wi-Fi control module 110 and a BLUETOOTH control module 120 and can be individually or collectively configured, managed and controlled via a mobile device 63, a mobile application 40, and a mobile device BLUETOOTH control module 122 and a mobile device Wi-Fi control module 112. Furthermore, the collection of invention units a living room personal energy platform 1001, a bedroom room personal energy platform 1002, an office personal energy platform 1003, a kitchen personal energy platform 1004, a first laundry room personal energy platform 1005, and a second laundry room personal energy platform 1006 can have predetermined and individually discrete consumer authorized management control functions administered by cloud-based service providers, a home security service provider 84, a healthcare service provider 85, a demand response program service provider 87, and a home energy management service provider 88, and an internet service provider 83. Thus, allowing remote service providers; such as a home security service provider 84, a healthcare service provider 85, a demand response program service provider 87, and a home energy management service provider 88 to coordinate consumer power usage whether an alternating current power input source wall outlet 52 is available and the grid is up, and when the alternating current power input source wall outlet 52 is not available and the grid is down. FIG. 8 shows in this use case, Energy Storage and Remote Services, utilizing the present invention with multiple invention units in the consumer's home to effectively achieve the primary objective of providing power to consumer devices when the alternating current power grid is not available as the more complex stationary residential energy storage systems; however, on an a la carte product purchase and personal energy platform 1000 deployment basis. FIG. 8 depicts the present invention's additional financial value of power savings, obtained by use of the present invention, that allows consumer to participate in power savings programs; demand response, load shedding, and capacity planning, whereby they receive power discounts and/or credits from their local utility provider. FIG. 8 perspective of the present invention presents the ability for remote invention administration and control by a home energy management service provider 88 and a demand response service provider 87 of the personal energy platforms a living room personal energy platform 1001, a bedroom room personal energy platform 1002, an office personal energy platform 1003, a kitchen personal energy platform 1004, a first laundry room personal energy platform 1005, and a second laundry room personal energy platform 1006 distributed within the residence.

Shown in FIG. 9 is a schematic view of the power control board 900 of the present invention presenting the physical layout and position of a micro-controller processor 100, a Wi-Fi control module 110, a BLUETOOTH control module 120, a first universal serial bus direct current output port 11, a second universal serial bus direct current output port 12, a first direct current output port 13, a second direct current output port 14, a third direct current output port 15, a fourth direct current output port 16, an alternating current input 90 volt alternating current to 240 volt alternating current input module, and a universal direct current input port 27. Thus, providing an efficient physical layout and placement of the personal energy platform's input and output ports positioning and maximizing the electrical circuitry performance and power delivery and management.

Shown in FIG. 10 is a schematic view of the portable module-80 watt 901 of the present invention 1000 presenting the primary programmable modules a micro-controller processor 100, a Wi-Fi control module 110, and a BLUETOOTH control module and the interconnected circuitry paths which represent the foundation for delivery power to the invention and providing the advanced functions and power services required by the power management system and battery management system.

Shown in FIG. 11 is a schematic view of the portable module output 902 of the present invention presenting the electrical circuitry layout of the invention's direct current output ports, a first universal serial bus direct current output port 11, a second universal serial bus direct current output port 12, a first direct current output port 13, a second direct current output port 14, a third direct current output port 15, and a fourth direct current output port 16. It is through the portable module output 902 that the invention can adjust the output voltages of individual direct current output ports programmatically initiated by the consumer to the micro-controller processor.

The present invention is capable of harnessing the latest in rechargeable battery chemistries and frees the consumer from mediocrity. Combining advances in battery chemistries with multiple invention devices, distributed wireless communications and intelligent processing capabilities; the invention allows consumers to manage their power usage while plugged into commercial grid power, or simply unplug from the an alternating current power input source wall outlet 52 for portable power situations or power outages and have unparalleled management and control over their power usage. Consumers further benefit from the ability to participate in power load reduction programs; such as Demand Response, Load Shedding, and Capacity Planning initiatives, where they receive lower power purchase costs per kilowatt-hour and additional rebates and credits for participation in these programs. With the present invention, consumers can participate in local utility incentive programs without the requirement to meet the utility interconnection standard for conventional residential energy storage systems, that add expensive power switching interconnection equipment, and duplicate installation of a smart meter 89 with their respective installation costs. Since the present invention is fully portable and can be utilized in a house, condominium, apartment, tiny home, automobile, recreational or mobile home, consumers can retain their power saving incentive program participation and savings benefits with them when they move and wherever they move to.

It is therefore a primary object of the present invention to provide programmable control of the power used across a system of power connected devices (programmable multi-device power control).

It is still another primary object of the present invention to provide programmable control of voltage and current made available to power ports.

It is still another primary object of the present invention to provide programmable control of voltage and current made available to power ports with user devices plugged in.

It is therefore a primary object of the present invention to provide remote control of the power used across a system of power connected devices (programmable multi-device power control).

It is still another primary object of the present invention to provide remote control of voltage and current made available to power ports.

It is still another primary object of the present invention to provide remote control of voltage and current made available to power ports with user devices plugged in.

It is still another primary object of the present invention to allow a simple user interface to set up the personal energy platform device using a picture to search and return the proper electrical settings for any attached device.

It is still another primary object of the present invention to allow a simple user interface to set up the personal energy platform device using a text description of the device to search and return the proper electrical settings for any attached device It is still another primary object of the present invention to allow a simple user interface to set up the personal energy platform device using a battery (picture or text) description of the device to search and return the proper electrical settings for any attached device It is still another primary object of the present invention to control the power needs of attached devices based on programming and the device current activity.

It is still another primary object of the present invention to control the power needs of attached devices based on programming and the device planned activity.

It is still another primary object of the present invention to control power backup for a system of power connected devices.

It is still another primary object of the present invention to maximize the mobility characteristics of mobile devices by extending the length of time they can be away from commercial power.

It is still another primary object of the present invention to allow remote access and control of the personal energy platform (by power companies, medical service providers, any kind of service provider, etc.)

It is still another primary object of the present invention to reduce cord clutter.

It is still another primary object of the present invention to increase the power available to attached devices.

It is still another primary object of the present invention to improve power usage efficiency by eliminating the need for separate power conversion devices for each attached device.

It is still another primary object of the present invention to improve power usage efficiency by eliminating the need of device stand-by states.

It is still another primary object of the present invention to retrieve power from dormant, or "off" condition, devices that are physically attached to the personal energy platform.

It is still another primary object of the present invention to retrieve power from dormant, or "off" condition, devices and redistribute that power to active devices.

It is still another primary object of the present invention, through power management, to increase the value and utility of any system device.

It is still another primary object of the present invention, through power management, to provide a means of parental control. [e.g. leave computer on for homework, but turn off the game console, TV, or to disable Internet access].

It is still another primary object of the present invention to supply power to components based on application needs.

It is still another primary object of the present invention to allow applications to be power prioritized and supply power to components based on "important" application needs.

It is still another primary object of the present invention to supply power to components "when necessary" based on application needs (e.g. Medical etc).

As used in this application, the term "a" or "an" means "at least one" or "one or more."

As used in this application, the term "about" or "approximately" refers to a range of values within plus or minus 10% of the specified number.

As used in this application, the term "substantially" means that the actual value is within about 10% of the actual desired value, particularly within about 5% of the actual desired value and especially within about 1% of the actual desired value of any variable, element or limit set forth herein.

All references throughout this application, for example patent documents including issued or granted patents or equivalents, patent application publications, and non-patent literature documents or other source material, are hereby incorporated by reference herein in their entireties, as though individually incorporated by reference, to the extent each reference is at least partially not inconsistent with the disclosure in the present application (for example, a reference that is partially inconsistent is incorporated by reference except for the partially inconsistent portion of the reference).

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Any element in a claim that does not explicitly state "means for" performing a specified function, or "step for" performing a specified function, is not to be interpreted as a "means" or "step" clause as specified in 35 U.S.C. § 112, ¶6. In particular, any use of "step of" in the claims is not intended to invoke the provision of 35 U.S.C. § 112, ¶6.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. An energy platform comprising:
a housing,
an alternating current (AC) input port,
one or more direct current (DC) input ports,
one or more AC output ports,
one or more DC output ports,
a one or more management systems;
wherein the AC input port, the one or more DC input ports, the one or more AC output ports, and the one or more DC output ports are located on the housing;
wherein the one or more management systems are located within the housing;
wherein the AC input port, the one or more DC input ports, the one or more AC output ports, and the one or more DC output ports are connected to the one or more management systems; and
wherein the one or more management systems are configured to receive electrical power from the AC input port and one or more DC input ports and control delivery of the electrical power to the one or more AC output ports and the one or more DC output ports wherein the housing comprises an octagon shape defined by a top surface, a bottom surface, and eight side surfaces, and wherein a front side of the housing is defined by three of the eight side surfaces; wherein the three of the eight side surfaces comprise a left side, a center side, and a right side defining at least a portion of a front side of the octagonal shape; and wherein no power source or output connectivity ports are deployed on the front side of the octagonal shape.

2. The energy platform of claim 1,
wherein the one or more management systems are configured to select a lowest cost power source by selecting an input port corresponding to the lowest cost power source.

3. The energy platform of claim 1,
wherein the one or more management systems are configured to give priority to one or more DC power source inputs over an AC power source input.

4. The energy platform of claim 3,
wherein the one or more management systems are configured to select the one or more DC input ports to deliver power to an output port prior to accessing power from the AC input port if power source voltage generation levels are available and sufficient.

5. The energy platform of claim 4,
wherein the one or more management systems are configured to determine if the one or more DC power input ports are available and supplied with sufficient power to use the one or more DC power input ports instead of the AC power input port.

6. The energy platform of claim 1,
wherein the one or more management systems comprise one or more batteries;
wherein the one or more batteries are located within the housing; and
wherein the one or more management systems are configured to deliver stored energy from the one or more batteries to one or more output ports in an absence of both a DC power source and an AC power source at one or more input ports.

7. The energy platform of claim 1,
wherein the energy platform is configured to utilize power from the AC input port and the one or more DC input ports simultaneously.

8. The energy platform of claim 1,
further comprising a mobile application (App);
wherein the one or more management systems are configured to connect to the App; and
wherein the App is configured to program the one or more managements systems to control power usage and power output for one or more devices attached to the energy platform.

9. The energy platform of claim 8,
wherein the App is configured to enable a user to record an image of the one or more devices.

10. The energy platform of claim 9,
wherein the App is configured to prepare the one or more management systems to supply appropriate voltage and current to the one or more devices using the image.

11. The energy platform of claim 9,
wherein the App is configured to use the image to determine one of more specifications for the one or more devices including: type, manufacturer, power connection type, and power specifications.

12. The energy platform of claim 9,
wherein the App is configured to adjust voltage and current settings for the one or more devices using the image without further consumer intervention.

13. The energy platform of claim 8,
wherein the App is configured to turn on and off one or more ports on the energy platform.

14. The energy platform of claim 8,
wherein the App is configured to control a current and a voltage delivered to the one or more devices.

15. The energy platform of claim 8,
wherein the App is configured to automatically label an outlet port as associated with the one or more devices.

16. The energy platform of claim 8,
wherein the App is configured to maintain a history of the one or more devices and their power specifications.

17. An energy platform comprising:
a housing,
an alternating current (AC) input,
a plurality of direct current (DC) inputs,
one or more AC output ports,
one or more DC output ports,
a one or more management systems;
wherein the one or more AC output ports and the one or more DC output ports are located on the housing;
wherein the one or more management systems are located within the housing;
wherein the AC input, the plurality of DC inputs, the one or more AC output ports, and the one or more DC output ports are connected to the one or more management systems; and
wherein the one or more management systems are configured to receive electrical power from the AC input and the plurality of DC inputs and control delivery of the electrical power to the one or more AC output ports and the one or more DC output ports;
wherein the one or more management systems comprise one or more batteries;
wherein the plurality of DC inputs include the one or more batteries;
wherein the one or more batteries are located within the housing;
wherein the one or more management systems are configured to deliver stored energy from the one or more batteries to one or more output ports in an absence of both a DC power source and an AC power source external to the housing; and
wherein the energy platform is configured to utilize power from the plurality of DC inputs simultaneously to power the one or more AC output ports and/or the one or more DC output ports wherein the housing comprises an octagon shape defined by a top surface, a bottom surface, and eight side surfaces, and wherein a front side of the housing is defined by three of the eight side surfaces; wherein the three of the eight side surfaces comprise a left side, a center side, and a right side defining at least a portion of a front side of the octagonal shape; and wherein no power source or output connectivity ports are deployed on the front side of the octagonal shape.

\* \* \* \* \*